United States Patent
Premjeyanth et al.

(10) Patent No.: US 6,839,128 B2
(45) Date of Patent: Jan. 4, 2005

(54) OPTOELECTRONIC DOCUMENT READER FOR READING UV / IR VISIBLE INDICIA

(75) Inventors: Sivasamy Premjeyanth, Nepean (CA); Michael Robert Balderston, North Gower (CA)

(73) Assignee: Canadian Bank Note Company, Ltd. (CA)

(*) Notice: Subject to any disclaimer, the term of this patent is extended or adjusted under 35 U.S.C. 154(b) by 267 days.

(21) Appl. No.: 10/094,207

(22) Filed: Mar. 8, 2002

(65) Prior Publication Data

US 2003/0169415 A1 Sep. 11, 2003

(51) Int. Cl.[7] .................................................. G06K 9/74
(52) U.S. Cl. ........................................................ 356/71
(58) Field of Search .......................... 356/71; 382/100, 382/112, 135, 137, 138, 218; 250/556, 461.1, 330, 336.1

(56) References Cited

U.S. PATENT DOCUMENTS

| | | |
|---|---|---|
| 5,286,286 A | 2/1994 | Winnik et al. |
| 5,471,281 A | 11/1995 | Hayashi et al. |
| 5,502,304 A | 3/1996 | Berson et al. |
| 5,548,106 A | 8/1996 | Liang et al. |
| 5,666,417 A | 9/1997 | Liang et al. |
| 5,719,948 A | 2/1998 | Liang |
| 5,992,750 A | 11/1999 | Chadima, Jr. et al. |
| 6,039,257 A | 3/2000 | Berson et al. |
| 6,064,476 A | 5/2000 | Goltsos |
| 6,088,133 A | 7/2000 | Francis et al. |
| 6,155,168 A | 12/2000 | Sakamoto |
| 6,264,107 B1 | 7/2001 | Thomas, III et al. |
| 6,269,169 B1 * | 7/2001 | Funk et al. ................. 382/100 |
| 6,603,871 B2 * | 8/2003 | Liang .......................... 382/135 |
| 2001/0035501 A1 | 11/2001 | Taylor et al. |
| 2002/0015145 A1 * | 2/2002 | Numata ........................ 356/71 |

FOREIGN PATENT DOCUMENTS

WO   WO 01/80512    4/2001

OTHER PUBLICATIONS

V.L. Engineering, Inc., excerpts from web–site http://www.vlengineering.com printed Mar./Apr., 2001.
Gunther International, *Regional User's Symposiums; Gunther named one of Connecticut's'Fast 50'; and Xplor2000—Gunther Shows Latest High–Speed Inserter–Series W.*, Copyright 1997–2000 from website http://guntherintl.com.

* cited by examiner

Primary Examiner—Michael P. Stafira
(74) Attorney, Agent, or Firm—Brinks Hofer Gilson & Lione (57) ABSTRACT

A document reader for optoelectronically illuminating, reading and interpreting (i.e. processing and analyzing) indicia appearing on a document in a machine readable zone thereof, wherein the indicia is made visible only under illumination by non-visible light (i.e. UV or IR). UV (or IR) light sources (LED's) of the reader are rapidly switched to a stable, peak UV (or IR) illumination frequency or frequency range to illuminate and render visible such covert UV-visible (or IR-visible) indicia. An optoelectronic image sensor (CCD) captures the document image, which includes the indicia rendered visible by the UV source illumination, and the covert indicia is identified from the captured image. An optical path, being folded by two mirrors so as to provide a compact geometry for the reader, extends between a reading surface on which the document is place and the image sensor. A lens configured for focussing light defining an image onto the sensor is provided in the optical path. The reader may also include bank(s) (array(s)) of visible light sources (LED's), for illuminating visible indicia, in addition to UV and IR LED arrays and any IR light sources may also be used for illuminating visible OCR characters according to ISO 1831. A controller is provided to sequentially activate each different light source bank.

16 Claims, 6 Drawing Sheets

OPTOELECTRONIC DOCUMENT READER FOR READING UV / IR VISIBLE INDICIA

FIELD OF THE INVENTION

This invention relates generally to the field of security equipment and, more particularly, to an optoelectronic document reader for reading matter which is visible only in the presence of illumination outside of the visible light spectrum i.e. ultraviolet (UV) or infrared (IR) light, such matter being in the form of text, images or other indicia printed onto a document or surface-visible matter embedded within a substrate of a document.

BACKGROUND OF THE INVENTION

Some known methods for improving the security of a document, such as a passport or other identity document, utilize materials which are visible only in the presence of ultraviolet (UV) light. Such materials have been added to certain inks used for security printing to print UV-visible indicia onto a document, whereby the average person viewing such document would be unaware that such indicia is present on the document but a knowledgeable person (e.g. a customs officer) would inspect such document under UV illumination to identify such indicia for purposes of assessing the authenticity of the document. The known devices used in the identification of such covert UV printed indicia comprise UV fluorescent tubes which emit UV illumination. In use, a document to be inspected is placed under the UV illumination emitted by such a device so that any covert UV-visible indicia on the document is caused to fluoresce with a visible light (i.e. is made visible to an inspector's eye). Disadvantageously, however, such devices are passive only, in that they simply serve to illuminate a specific area; they are themselves unable to read (i.e. via an automated process so as to interpret) invisible indicia which has been printed by means of a UV fluorescent ink. Instead, a user of such known devices is required to manually view and personally interpret the resulting image in order to determine whether the document comprises any covert indicia. Moreover, UV fluorescent tubes have a lengthy stabilization time and, therefore, they are unable to accommodate any high speed processing application such as would be required by an automated device for reading UV-ink printed indicia. Moreover, such tubes are inherently unstable (and, thus, unreliable) because the peak wavelength of the illumination they produce typically varies over time.

There is a need, therefore, for a document reader which operates on an automated basis for relatively high speed processing of security documents having matter associated therewith which is visible only when illuminated by UV or IR light. Further, there is a need for a document reader which is able to read such covert UV-ink (or IR-ink) printed indicia on a full-page basis. There is also a need for such a reader which is able to illuminate one or more predetermined surface areas of a document with light whose frequency or frequency band is/are within one of the infrared, visible and ultraviolet light frequency bands, depending on the particular indicia on such areas of the document which is to be read, and to switch rapidly from one such frequency or band to another. Still further, there is a need for a document reader which is able to automatically read and interpret such indicia. Moreover, there is a need for such a document reader comprised of solid state components enabling a reduction or elimination of moving parts.

SUMMARY OF THE INVENTION

In accordance with the invention there is provided an optoelectronic document reader and method for automated reading of first indicia in a machine readable zone of a document, the first indicia being invisible when illuminated with visible light and visible when illuminated with invisible light of a predetermined frequency range. A reading surface is provided for placement of a document comprising the machine readable zone to be read by the reader. A plurality of first light sources are spaced apart from the reading surface and configured for illuminating the machine readable zone of a document on the reading surface with invisible light of the predetermined frequency range (e.g. UV light having a peak wavelength of 370 nm) when the first light sources are activated so as to cause the first indicia to become visible. An image sensor is configured for capturing an image defined by light focussed thereon and producing electronic data representative of the captured image. An optical path extends between the reading surface and the image sensor and comprises a lens configured for focussing light defining an image onto the sensor. A document image comprising the first indicia defined by light emitted and/or reflected by the machine readable zone of the document on the reading surface when the first light sources are activated, is transported to the sensor via the optical path and captured by the sensor. A document controller is configured for identifying the indicia from the captured image and outputting the identified indicia for display and/or processing;

The first light sources may be UV LED's configured for emitting light of a predetermined ultraviolet frequency range whereby the first indicia comprises UV fluorescent matter configured for emitting visible light when illuminated by the light of the predetermined ultraviolet frequency range. Preferably, the optical path is folded by a plurality of reflecting surfaces within the optical path.

The document reader is also preferably configured for automated reading of second indicia in the machine readable zone, the second indicia being visible when illuminated with visible light. A plurality of second light sources (e.g. visible LED's) are spaced apart from the reading surface and configured for illuminating the machine readable zone with visible light (e.g. having a peak wavelength of 650 nm) when activated. Upon activation of the second light sources the document image comprises the second indicia defined by light emitted and/or reflected by the machine readable zone. In addition, the document reader is preferably further configured for automated reading of third indicia in the machine readable zone, the third indicia comprising characters configured according to OCR standards specification. A plurality of third light sources (e.g. IR LED's) are spaced apart from the reading surface and configured for illuminating the machine readable zone with light of a predetermined infrared frequency range according to the OCR standards specification when the third light sources are activated. Upon activation of the third light sources the document image comprises the third indicia defined by light emitted and/or reflected by the machine readable zone.

A controller configured for controlling activation of the light sources (e.g. on a sequential basis in the order of IR, visible and UV), an optical filter positioned within the optical path between the lens and image sensor, the optical filter configured for removing reflected light of the first light sources, and a document controller configured for identifying the indicia from the captured image and outputting the identified indicia for display and/or processing may be provided.

The light sources are arranged in such a manner that a first bank comprises the first light sources, a second bank comprises the second light sources and a third bank comprises the third light sources, the light sources of each the bank being arranged to provide uniform illumination of the machine readable zone. In addition, the illumination produced by each bank of light sources is of comparable intensity to avoid saturation of the image sensor.

DESCRIPTION OF THE DRAWINGS

The present invention is described in detail below with reference to a preferred embodiment and the following drawings pertaining thereto in which like reference numerals refer throughout to like elements.

DETAILED DESCRIPTION OF A PREFERRED EMBODIMENT

Figure 1A:
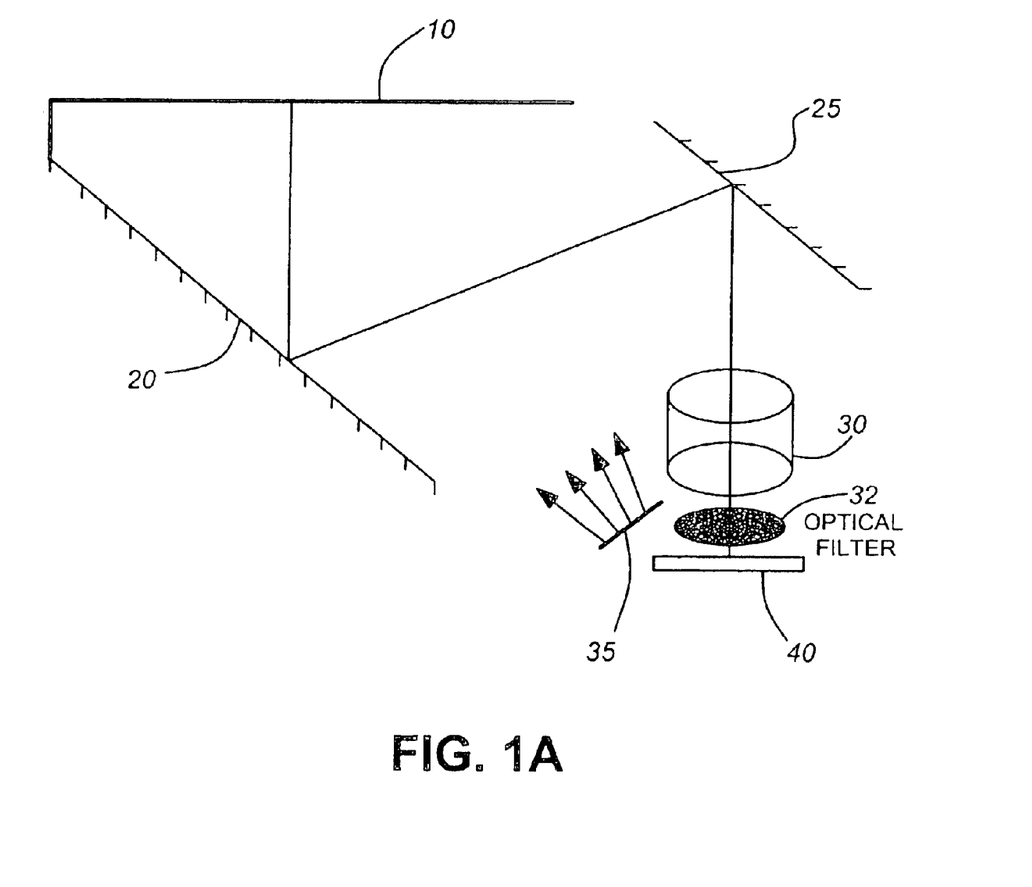
FIGS. 1(a) and 1(b) are schematic diagrams illustrating the optical principles of operation, and the optical paths, respectively, of a document reader in accordance with the invention.
Figure 1B:
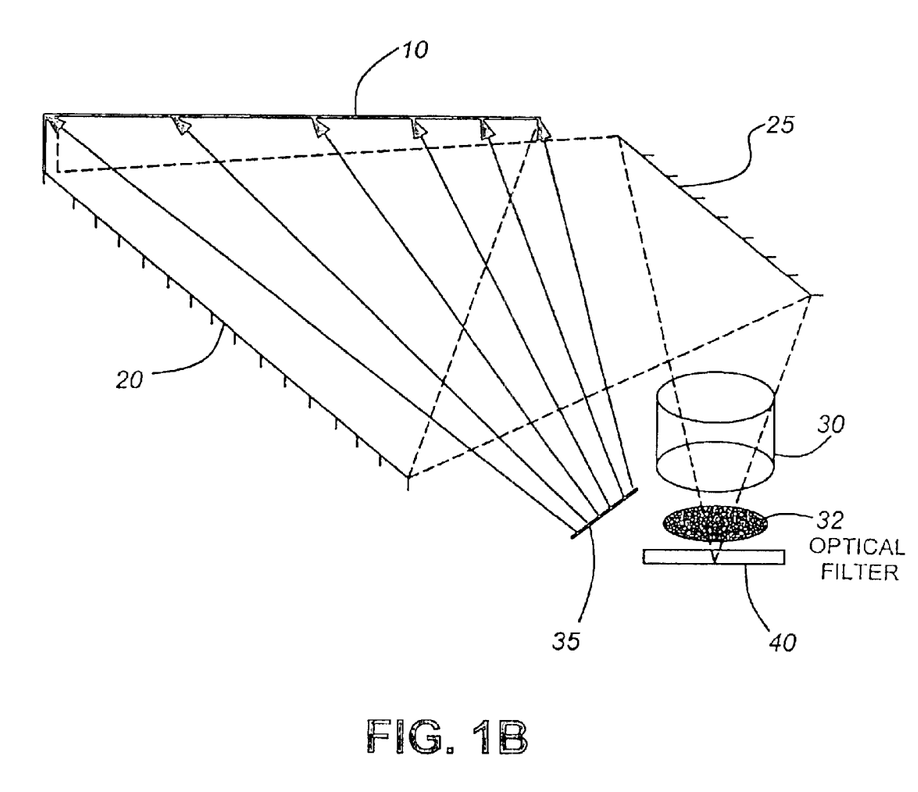

FIG. 1 of the drawings illustrates the optical principles of operation which are applied by a preferred embodiment of a document reader in accordance with the invention. A document 10 is illuminated, on a controlled and rapid basis, with light emitted from an array of light sources 35 comprising banks of three different types of LED's, namely, IR LED's which emit light in the infrared frequency band, visible LED's which emit light in the visible frequency band (the visible spectrum) and UV LED's which emit light in the ultraviolet frequency band. The different types of LED's (i.e. IR, visible and UV) are illuminated on a sequenced basis in the preferred embodiment whereby the LED's are illuminated sequentially according to the type of LED, for example in the order of IR illumination first, visible illumination second and UV illumination third. Optionally, the user may select a frequency or category of frequency (e.g. UV) to correspond to one of the LED types used in order to rapidly illuminate and read a specific image of interest.

Many security documents, such as machine readable travel documents (MRTD's), contain printed information which must conform to both the International Standards Organization ISO 1831 standard governing the reading of characters by means of an optical character recognition (OCR) specification as well as the specification for travel documents set by International Civil Aviation Organization ICAO (document 9303, paragraph 7.2.1) requiring that such characters be visible. As defined in ISO 1831, any security feature appearing in the machine readable zone (MRZ) of a document is not to interfere with accurate reading of any OCR characters at the B900 range i.e. in the near infrared (900±50 nm) portion of the spectrum.

Optionally, the IR LED bank may be used for either or both of two purposes, one being for character reading according to the OCR standard noted above, and a second being for illuminating a covert IR-visible indicia so as to render such indicia visible and, thus, readable. In such an embodiment, covert indicia would be printed onto the document using a material (i.e. ink) which fluoresces under IR illumination of the frequency emitted by the IR LED's. In this manner, such covert IR-visible indicia would function in the same manner as the covert UV-visible indicia of the embodiment described herein.

A transparent window (not shown) provides a reading surface for placement of the document 10 and a protective housing surface for the reader, the window being located between the document and the optical components of the reader shown in FIG. 1.

The LED-emitted light waves provide a uniform (i.e. even) illumination of the whole machine readable zone (MRZ) of the document which is to be read under such illumination and this allows the document to be read quickly, on a page-by-page basis. The light waves emitted by and/or reflected from the document 10 are transmitted to and reflected by a lower mirror 20 to an upper mirror 25 where they are reflected downwards, first through a lens 30, which collects and focuses photons of the document-emitted/reflected light waves, then through an optical filter 32, and then onto an optoelectronic image sensor 40.

As shown, the optical characteristics and mechanical positioning of the lens 30 and mirrors 20, 25 are chosen so that the entire MRZ (being up to 120 mm×80 mm in the embodiment described herein) is focused onto the optoelectronic image sensor 40 (being 6.91 mm×4.6 mm in the embodiment described herein) without incurring significant distortion and so that the longer optical path folds into a compact arrangement inside the reader.

The printed fluorescing matter on the document 10 which is excited by the UV LED illumination emits a broader frequency spectrum of light waves than is required to produce a sharp image on the sensor 40 and the optical filter 32 (which has a cut-off wavelength at 420 nm) reduces that broad spectrum. The optical filter 32 does not affect the visible or near-IR light but does eliminate the reflected, unwanted UV electromagnetic waves (to which the CCD image sensor is sensitive and which can make the image appear too light and hazy), and some visible light waves in the violet frequency band so that such light waves do not reach the image sensor 40. Advantageously, the elimination of unwanted UV spectrum components improves the visible and near-IR band images.

The image sensor 40 selected for use in the document reader described herein is a CCD (charge coupled device), specifically a sensor sold under the product identifier KAF-401E manufactured or supplied by Eastman Kodak Company of the U.S. Other sensors which may suitable for use in a different embodiment include a CMOS sensor, such as that provided by Kodak under product identifier KAC-1310, and a CIS (Contact Image Sensor).

A MRZ (viewing area) of 120 mm×80 mm (see the area 50 of the document 10 shown in FIG. 2) is captured by the image sensor 40 for extraction of a particular feature, such as a portable data file (PDF) image, a visible image such as a photograph, OCR text, UV printed matter, etc., and the extracted feature, and optionally the captured image also, are transmitted by the sensor 40 to a host computer by means of an RS-232 port, a parallel port or an Ethernet interface device. Advantageously, the CCD 40 and associated hardware captures the image in the form of digital data having a resolution of 768 pixels×512 pixels for this viewing area (if desired, a higher resolution can be obtained by selecting a different sensor).

The optical path of the reader is shown by FIG. 1(b). The geometry of the optical path is dependent upon the magnification (being 0.058 in the embodiment described herein), the field of view (FOV) and the focal length (being 10.3 mm in the embodiment described herein) of the lens 30. The two mirrors 20, 25 shown by FIGS. 1(a) and 1(b) are used to fold the path and thereby minimize its size so as to fit into the compact reader. The F-number of the lens (selected to be 2.8 for the embodiment of the described embodiment) is selected on the basis of the illumination, depth of focus, diffraction and aberration effects.

Previously, it was thought by persons skilled in the art that a high resolution automated imaging reader according to that of the present invention could not be made operative due to the effects of chromatic aberration when using multiple spectral bands and the foregoing performance deficiencies associated with the UV light tubes. Visible/invisible light LED devices which emit peak frequencies extending close to or below the visible spectrum have become known for use in laser technologies. Surprisingly, the applicants have determined that an array of similar solid state LED devices, configured to emit UV light, may be used successfully and advantageously in a document reader to achieve automated UV image reading.

The applicants have found that use of an appropriate UV fluorescent printing material together with an appropriate UV illumination, combined with use of a lens 30 having a sufficient depth of focus, reduces the effects of such chromatic aberration to a level which is acceptable. In addition, since the UV fluorescent material of the document acts a light source under UV illumination, unlike visible printed characters/images which absorb light, for purposes of accuracy on reading the UV ink printed matter, it is necessary that the document substrate, as well as any protective covering placed over the document, be UV dead (meaning that it should not contain superfluous UV excitable matter which would interfere with the correct image to be read) and that the background area of the UV ink printed areas be absorbing (i.e. dark) and non-interfering. Additionally, it is necessary to avoid saturating the image sensor. This is avoided by ensuring that the intensities of the light emitted/reflected by the document on illuminating the different LED banks are matched (i.e. by appropriately controlling the activation levels of the LED's).

The use of UV LED's (as compared to tubes) enables the exposure time for UV illumination to be closely controlled and rapidly switched. Specifically, when using an LED having a stabilization time of 50 nanoseconds, UV illumination may be switched on and off within a few milliseconds. The choice of UV light frequency to be used for illuminating the document is dependent upon the UV LED to be selected and, this, in turn, is dependent upon the exciting material of the ink or substrate which is used as the hidden security material to be read by the reader. For the preferred embodiment, UV LEDs supplied and/or manufactured by Nichia Corporation, under the product identifier NSHU550E, were selected for use in the UV light source array. This UV LED product emits a narrow band illumination having a peak wavelength at 370 nm and provides a short stabilization time (i.e. the time needed from activation to achieve peak wavelength illumination) of 50 ns. This UV LED also has built into it a Zener Diode providing protection against electrostatic discharge (ESD). The applicants have found that selection of a UV fluorescent printing ink which, when excited by a predetermined UV frequency light (i.e. of wavelength 370 nm in the preferred embodiment), emits an appropriate frequency (i.e. in the preferred embodiment being a blue light of approximate wavelength 423 nm) of visible light, combined with use of a lens 30 having sufficient depth of focus and less chromatic aberration to reduce chromatic aberration effects to a level which is acceptable with the use of software as described herein, results in a capturing of a usable image of the UV-ink printed indicia. Undesirably, some unwanted light frequencies are caused to be reflected onto the lens 30. To block these unwanted UV light frequencies an optical filter 32 is included in the optical path prior to the sensor 40, the filter 32 being a high pass UV filter having a cut-off at 420 nm (supplied and/or manufactured by Edmund Industrial Optics under the product identifier GG420).

UV fluorescent inks are well-known in the art and one skilled in the art will be readily able to make an appropriate selection of a UV fluorescent ink for use for printing the covert matter onto the document for any given application. For example, for a thermal transfer printing application the ink described in U.S. Pat. No. 6,155,168 assigned to Alps Electric Co., Ltd. of Tokyo, Japan may be selected for use. A further source of suitable UV fluorescent inks is Angstrom Technologies Inc. of Kentucky, U.S.A. For laser printing applications, a suitable UV fluorescent electrostatic toner is available from this company.

The document reader is able to detect and process different types of covert matter including different types of hidden images printed with UV fluorescent ink, including machine-readable character lines of text, two dimensional barcodes and security device images such as those produced by the assignee of this application, referred to a Pixelplex images, using overlaid deflection and encrypted images, based on a source image (as described in detail in said assignee's pending U.S. patent application Ser. No. 09/553,454 filed on Apr. 19, 2000, and the corresponding PCT published application no. WO 01/80512, the contents of which is incorporated herein by reference).

Optionally, the optical path may include an electrostatic mirror (not shown in FIG. 1) with reflection and transparent states to authenticate optically variable devices applied to the document such as holograms or kinegrams.

Figure 2:
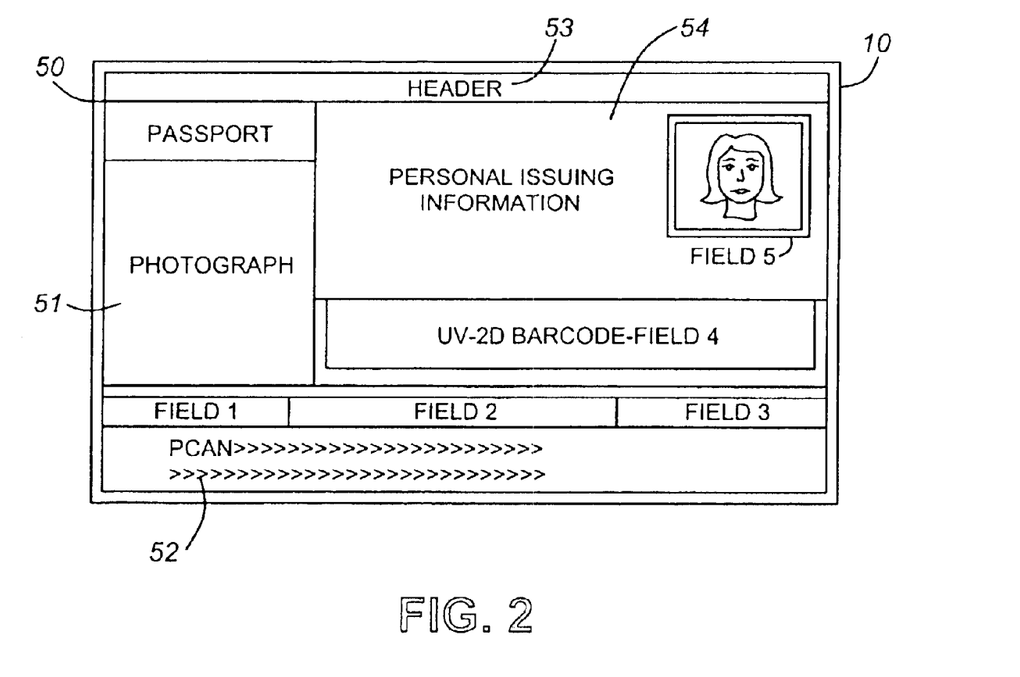
FIG. 2 is a schematic diagram of a plan view of an illustrative document as contemplated for use with a document reader in accordance with the invention, this illustrative document comprising five distinct fields (areas) on which different types of identification indicia are printed using an ink which is visible only under illumination outside of the visible light spectrum.

FIG. 2 of the drawings shows a plan view of a sample layout of a document namely, the identification page of a passport, whereby five independent security fields comprising UV fluorescent material are provided. Fields 1 and 3 each comprise machine readable text (alpha-numeric characters) printed with a suitable fluorochrome material which fluoresces when illuminated by a predetermined UV frequency corresponding to the frequency band of the selected UV LED's. The UV-illuminated text images are detected by the image sensor 40 and then interpreted using a conventional OCR-B text algorithm (such algorithms being well-known to persons skilled in the art and readily available in the marketplace). Preferably, to increase the security provided by these fields, the text is scrambled and encrypted using an appropriate software algorithm (such algorithms being readily available in the marketplace). In the preferred embodiment the contents of Field 3 is numbers corresponding to the passport number such that this field is used as a cross-check against a visibly printed passport number appearing on the document.

Field 2 of the sample document shown in FIG. 2 comprises encoded indicia which represents text, the text having been encoded using deflection images so that it appears, in UV fluorescent material, as a series of vertical lines. This indicia is also detected by the image sensor 40 and interpreted (i.e. decoded) by suitable software in the reader.

Field 4 comprises a two dimensional barcode in the form of a portable data file (PDF) 417 image which is printed in UV fluorescent material. As is well-known by persons skilled in the art, the two dimensional barcode image may comprise any combination of image(s) and alphanumeric text as permitted by the particular resolution used. The PDF image is detected by the image sensor 40 and interpreted by suitable software in the reader. Optionally, the barcode is broken up into several pieces and those pieces are distributed over the document page in a predetermined manner (being information which is known or learned by the reader's software systems). Since none of the barcode is visible to the user under ordinary light the fact that the barcode is fragmented does not affect the user. It does, however, provide another security feature to the document since the specific arrangement of the fragments read by the reader must coincide with the predetermined arrangement known by the reader. If the barcode fragment arrangement read by the reader is found not to correspond to the known arrangement, the reader identifies the document as having failed the authentication assessment process performed by it.

Field 5 comprises a security device Pixelplex image printed in UV fluorescent material. As shown in FIG. 2, the encrypted source image represented by the covert Pixelplex image is preferably the passport holder's photograph as it appears on the identification page at the time the passport is issued to the authorized holder, whereby the photograph of the passport holder is revealed upon decryption of the Pixelplex image.

A further security feature (not shown on FIG. 2) is provided by the substrate material of the document page and is not limited to any of Fields 1–5, namely, a random distribution of UV-fluorescent pulp fibers within the sheet of paper which comprises the document page. It is known that a small number of such fibers are introduced during the normal manufacturing security papers and that their resulting location within the finished paper substrate is randomly determined. The random nature of these fibers is used to advantage to provide security by identifying their location on the page at the time the document is created or issued and associating those specific locations with that particular document. The document reader detects and reads these fibers, including their location on the page, and compares this information with the known information pertaining to the fiber locations at the time of the creation or issuance of the document. If the two sets of information do not coincide the reader identifies the document as having failed the authentication assessment process.

Figure 3:
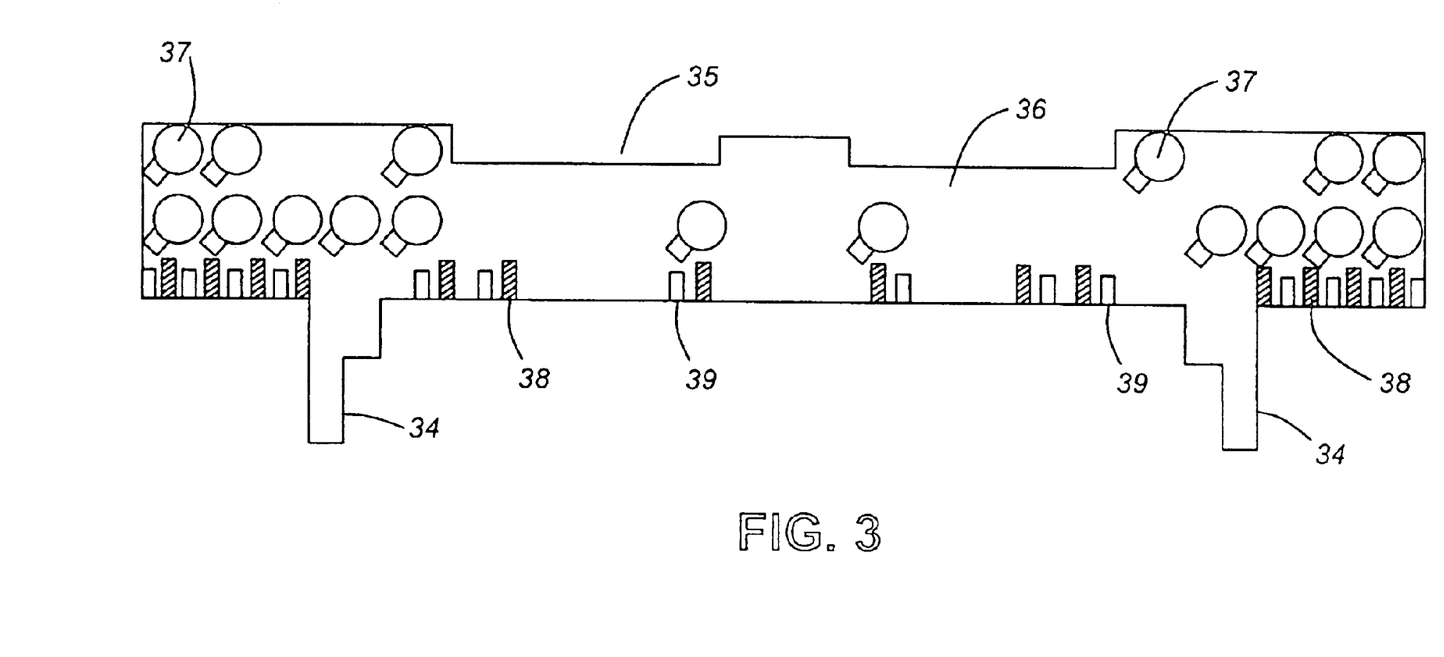
FIG. 3 is a schematic diagram illustrating the relative numbers of IR, visible and UV LED's used in a preferred embodiment of a document reader according to the invention.

FIG. 3 of the drawings illustrates the arrangement of LED banks 35 in the preferred embodiment of the document reader. The LED's are mounted on a substrate 36 in the form of a strip of thermoplastic material having two mounting tabs 34 for installation within and across the reader as shown in FIGS. 1(*a*) and (*b*). The pattern (arrangement) of LED's in each LED bank is configured to provide sufficient and uniform illumination to the document 10 taking into account the following factors: (i) the directivity (viewing angle) of the LED's; (ii) non-linear human visual perception of image (i.e. unit changes in luminance do not correspond to unit changes in visual sensitivity); (iii) the dynamic range of the image sensor (CCD), to avoid saturation; (iv) the varying response of the image sensor (CCD) to wavelength changes in that the sensor's quantum efficiency (QE) is higher at red and lower at blue; and (v) required compactness to fit onto the substrate. As shown by FIG. 3, the UV LED's 37 are laterally distributed over the substrate with a greater number of the UV LED's 37 positioned towards each end of the substrate 36. Similarly, near-IR LED's 38 and visible LED's 39 are laterally distributed over the substrate 36 with a higher concentration of each occurring at the ends of the substrate 36.

The three banks (sets) of LED's are activated in sequence for a period of time determined on the basis of the brightness of the printing material (i.e. the ink), this activation period typically being between 10 milliseconds and 2 seconds. For a normal operating mode of the preferred embodiment the preferred sequence order for activating the LED banks is IR LED's, visible LED's and then UV LED's. The near-IR LED's emit light at a peak frequency within the range of 900±50 nm to meet the ISO 1831 standard. The visible LED's emit light within the range 400 nm–660 nm and the UV LED's emit light within the range 360 nm–380 nm, and having a peak frequency at 650 nm and 370 nm, respectively. However, any or all of the LED's may be activated at a given time, for a given application, in order to illuminate the particular printed image(s) of interest to the user. For example, the IR LED's may be activated when it is desired to read text printed on the document using optical character recognition processing in accordance with the ISO 1831 standard. Likewise, the visible LED's may be activated to illuminate the visibly printed subject matter on the page being read by the reader and/or the UV LED's may be activated to illuminate the images printed with UV fluorescent ink. The illuminated images are focused onto the image sensor 40 and interpreted by the host computer's software systems to produce a display of the result (i.e. of the read image) for the user.

Figure 4:
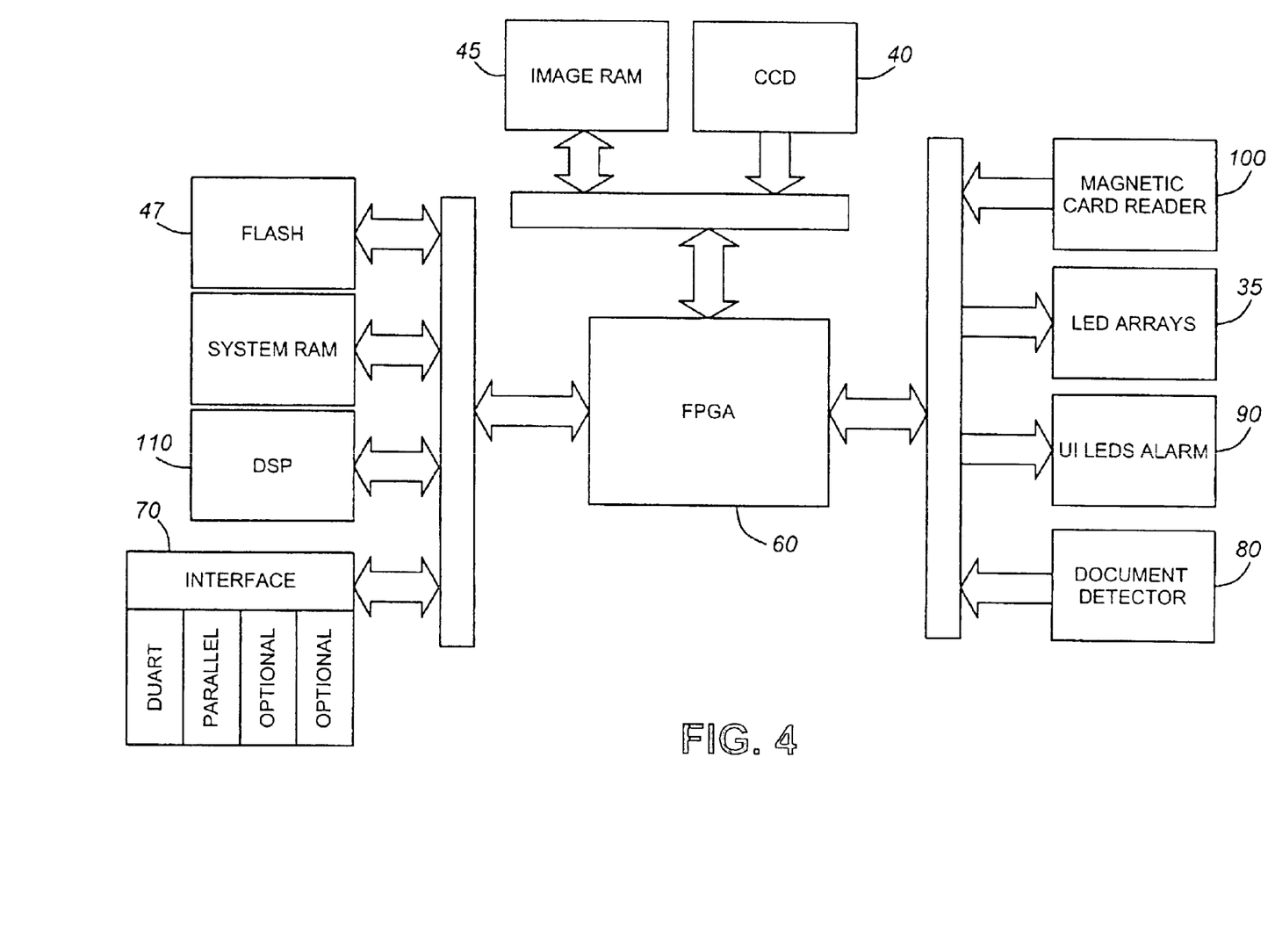
FIG. 4 is a schematic block diagram showing the components of a preferred embodiment of a document reader according to the invention; and, FIG. 5 is a flow chart showing the steps performed by exemplary software run on the document reader of FIG. 4.

FIG. 4 shows, in block diagram form, the components of the preferred document reader and their interaction. The image sensor 40, being a CCD in the preferred embodiment, captures the image which is visible under the applied illumination in the form of digital data which is transferred to an image Random Access Memory (RAM) 45. Flash memory chips 47 are provided to store firmware and configuration data. A Digital Signal Processor (DSP) performs processing functions on the digitized image information, the DSP selected for use in the preferred embodiment being supplied by Texas Instruments under product identifier TMS320C32. A reader controller 60, in the form of a field-programmable Gate Array (FPGA) logic chip, is used in the preferred embodiment to perform various controller functions as shown by FIG. 4, including the transfer of data from the CCD 40 to the image RAM 45, controlling the data bus between the DSP 110 and the image RAM 45, controlling the peripheral interface (including controlling the LED arrays 35) and image enhancement. The resulting document image is transferred to a host computer (not illustrated) by means of a serial, parallel or Ethernet interface 70.

A document detector 80 detects the presence of a document 10 on the reading surface of the reader using a combination of photo detector and IR sensor circuits. User Interface LED's (UI LED's) 90 are provided to show the status of operations. The LED's of the LED array banks 35 are solid state devices which are rapidly controllable by software running on the document reader. A magnetic reader 100, able to read up to four tracks of data, is also provided to read data contained on magnetic strip applied to the document, if any.

Figure 5:
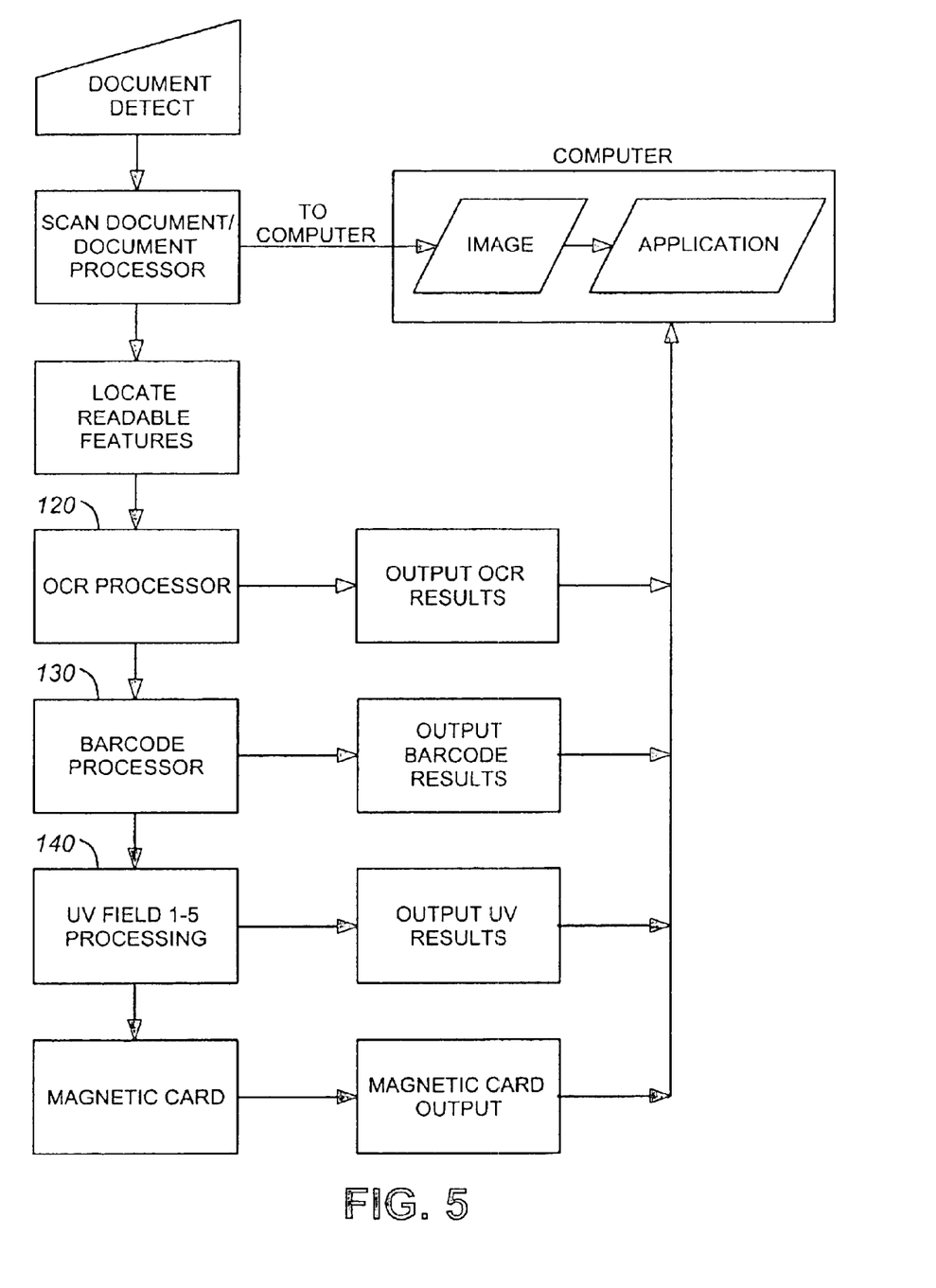

FIG. 5 is a flow chart showing the steps performed by document controller firmware run by the document reader.

The document controller software controls the activities performed by the document reader and, in doing so, it determines which software components are run in order to process input an produce the required output. As such, the functionality of the document reader is limited to documents which have a configuration falling within the scope of the controller software (i.e. to those which can be processed thereby) and, thus, the document reader is effectively matched to a predetermined type of document.

When the presence of a document is detected by the document detector 80 of the reader, the document is scanned by exciting the IR, visible and UV LED bank so as to illuminate the MRZ with one or more of visible, IR and UV illumination, respectively. As stated above, these differing illumination frequency LED banks are normally excited on a sequential basis but can be excited on a directed (individual) basis as desired. For each scanned (i.e. visible) image appearing in the MRZ of the document as a result of the applied illumination, the image is captured by the image sensor (i.e. the CCD 40 in FIG. 4) of the reader and forwarded to a host computer for processing by one or more applications running on the host computer (as desired). A feature locator component of the document controller software locates and identifies the individual features (indicia) of the document image. Specifically, with reference to FIG. 2, it locates and identifies the following indicia of the machine readable zone of the document: the visible photograph 51; the barcode 52; the OCR text 53, 54; and, the UV visible fields 1–4.

Different types of features are processed differently by individual software components configured appropriately to take the desired processing steps. An OCR software component 120 processes the OCR features 53, 54 according to conventional processing steps whereby the lines of OCR-B characters of these features are recognized and interpreted. As is known to persons skilled in the art, the OCR software component preferably includes processing steps for context and format checking to determine possible errors in the identified characters. The OCR software component 120 outputs the interpreted character set determined by it and this output is forwarded to a host computer for display on a monitor and/or further processing as desired. Optionally, the output characters could instead be directly forwarded to an electronic display (such as, for example, if associated processing by other software applications is not desired).

A PDF software component 130 isolates, analyses and decodes the PDF417 barcode feature 52. A UV field software component 140 determines the images of the UV fields 1–5 and, where applicable, processes these images using the foregoing OCR and PDF software components. A magnetic card reader software component is also preferably provided for processing data read by a magnetic card reader 100 of the reader. As for the output of the OCR component, the outputs of each of these software components is forwarded to the host computer for further processing and/or display on a monitor.

The individual optoelectronic system and software processing functions utilized in the foregoing described embodiment are well understood by those skilled in the art. It is to be understood by a person skilled in the field of optoelectronics and image processing that a variety of other implementations may be devised for substitution and such persons are expected to be able to apply the present invention to implement various applications of the same.

Consequently, it is to be understood that the particular embodiment described herein by way of illustration is not intended to limit the scope of the invention claimed by the inventors which is defined by the appended claims.

What is claimed is:

1. An optoelectronic document reader for automated reading of first indicia in a machine readable zone of a document, said first indicia being invisible when illuminated with visible light and visible when illuminated with invisible light, said reader comprising:
    (a) a reading surface for placement of a document comprising said machine readable zone to be read by said reader;
    (b) a plurality of UV LED first light sources spaced apart from said reading surface and configured for illuminating said machine readable zone of a document on said reading surface with invisible light of a predetermined ultraviolet frequency range when said first light sources are activated so as to cause said first indicia to become visible, said first indicia comprising UV fluorescent matter configured for emitting visible light when illuminated by said invisible light of said predetermined ultraviolet frequency range;
    (c) an image sensor configured for capturing an image defined by light focussed thereon and producing electronic data representative of said captured image;
    (d) an optical path extending between said reading surface and said image sensor and comprising a lens configured for focussing light defining an image onto said sensor;
    (e) an optical filter positioned within said optical path between said lens and image sensor, said optical filter configured for removing reflected light of said first light sources; and,
    (f) a document controller configured for identifying said indicia from said captured image and outputting said identified indicia for display and/or processing;
    wherein a document image comprising said first indicia defined by light emitted and/or reflected by said machine readable zone of said document on said reading surface when said first light sources are activated, is transported to said sensor via said optical path and captured by said sensor.

2. An optoelectronic document reader according to claim 1 wherein said optical path is folded by a plurality of reflecting surfaces within said optical path.

3. An optoelectronic document reader according to claim 2 and further configured for automated reading of second indicia in said machine readable zone, said second indicia being visible when illuminated with visible light, said reader further comprising a plurality of second light sources spaced apart from said reading surface and configured for illuminating said machine readable zone with visible light when said second light sources are activated, wherein upon activation of said second light sources said document image comprises said second indicia defined by light emitted and/or reflected by said machine readable zone.

4. An optoelectronic document reader according to claim 3 and further configured for automated reading of third indicia in said machine readable zone, said third indicia comprising characters configured according to OCR standards specification, said reader further comprising a plurality of third light sources spaced apart from said reading surface and configured for illuminating said machine readable zone with light of a predetermined infrared frequency range according to said OCR standards specification when said third light sources are activated, wherein upon activation of said third light sources said document image comprises said third indicia defined by light emitted and/or reflected by said machine readable zone.

5. An optoelectronic document reader according to claim 4 wherein said second light sources are visible LED's.

6. An optoelectronic document reader according to claim 5 wherein said third light sources are IR LED's.

7. An optoelectronic document reader according to claim 6, and further comprising a controller configured for controlling activation of said light sources.

8. An optoelectronic document reader according to claim 7 wherein said controller is configured for activating said first, second and third light sources in a sequential manner.

9. An optoelectronic document reader according to claim 8 wherein said light sources are activated in the order of said third light sources, said second light sources and said first light sources.

10. An optoelectronic document reader according to claim 9 wherein said light sources are arranged in such a manner that a first bank comprises said first light sources, a second bank comprises said second light sources and a third bank comprises said third light sources, said light sources of each said bank being arranged to provide uniform illumination of said machine readable zone.

11. An optoelectronic document reader according to claim 10 wherein said illumination produced by said banks is of comparable intensity to avoid saturation of said image sensor.

12. An optoelectronic document reader according to claim 11 wherein said illumination of first light sources has a peak wavelength of 370 nm.

13. An optoelectronic document reader according to claim 12 wherein said illumination of said second light sources has a peak wavelength of 650 nm.

14. An optoelectronic document reader according to claim 13 wherein said illumination of said third light sources has a peak wavelength of 850 nm.

15. An optoelectronic document reader according to claim 1 wherein said first indicia comprises encoded information.

16. A method for automated reading of first indicia in a machine readable zone of a document, said first indicia being invisible when illuminated with visible light and visible when illuminated with invisible light, said method comprising:

(a) providing a reading surface for placement of a document comprising said machine readable zone;

(b) providing a plurality of UV LED first light sources spaced apart from said reading surface and configured for illuminating said machine readable zone of a document on said reading surface with invisible light of a predetermined ultraviolet frequency range when said first light sources are activated so as to cause said first indicia to become visible, said first indicia comprising UV fluorescent matter configured for emitting visible light when illuminated by said invisible light of said predetermined ultraviolet frequency range;

(c) providing an mage sensor configured for capturing an image defined by light focussed thereon and producing electronic data representative of said captured image;

(d) providing an optical path extending between said reading surface and said image sensor and comprising a lens configured for focussing light defining an image onto said sensor;

(e) providing an optical filter positioned within said optical path between said lens and image sensor, said optical filter configured for removing reflected light of said first light sources; and, (f) providing a document controller configured for identifying said indicia from said captured image and outputting said identified indicia for display and/or processing;

whereby a document image comprising said first indicia defined by light emitted and/or reflected by said machine readable zone of said document on said reading surface when said first light sources are activated, is transported to said sensor via said optical path and captured by said sensor.

\* \* \* \* \*